US006769496B2

(12) United States Patent
Casali et al.

(10) Patent No.: US 6,769,496 B2
(45) Date of Patent: Aug. 3, 2004

(54) STRUT FOR A HITCH DEVICE FOR ATTACHING FARM IMPLEMENTS TO A TRACTOR

(75) Inventors: Paolo Casali, Modena (IT); Paul John Brooks, Modena (IT)

(73) Assignee: New Holland North America, Inc., New Holland, PA (US)

( * ) Notice: Subject to any disclaimer, the term of this patent is extended or adjusted under 35 U.S.C. 154(b) by 55 days.

(21) Appl. No.: 10/348,508

(22) Filed: Jan. 21, 2003

(65) Prior Publication Data
US 2003/0159842 A1 Aug. 28, 2003

(30) Foreign Application Priority Data

Feb. 1, 2002 (IT) .................................... BO2002A0060

(51) Int. Cl.[7] .......................................... A01B 59/041
(52) U.S. Cl. ...................................... 172/439
(58) Field of Search ................................ 172/272, 439, 172/447, 448, 450, 677, 679, 681, 776; 403/43, 46, 44; 280/460.1, 461.1, 455.1

(56) References Cited

U.S. PATENT DOCUMENTS

| 5,765,957 | A | * | 6/1998 | Connell ........................ 403/46 |
| 6,056,069 | A | * | 5/2000 | Hagen et al. ................ 172/679 |
| 6,089,328 | A | * | 7/2000 | Moore et al. ................ 172/447 |
| 6,283,488 | B1 | * | 9/2001 | Adamek et al. .......... 280/455.1 |
| 6,443,236 | B2 | * | 9/2002 | Staude ......................... 172/439 |
| 6,478,094 | B2 | * | 11/2002 | Alexander et al. ........... 172/439 |

* cited by examiner

Primary Examiner—Robert E. Pezzuto
(74) Attorney, Agent, or Firm—John William Stader; Collin A. Webb

(57) ABSTRACT

A strut is provided for a three-point hitch device used to attach farm implements to an agricultural tractor. The strut is substantially symmetrical with respect to a longitudinal axis of symmetry, and has a system for adjusting its length along the axis. The adjusting system has fast, discrete length adjustment devices, and two infinite length adjustment devices. The two infinite length adjustment devices are located on opposite sides of a dividing member positioned crosswise to the axis of the strut.

10 Claims, 2 Drawing Sheets

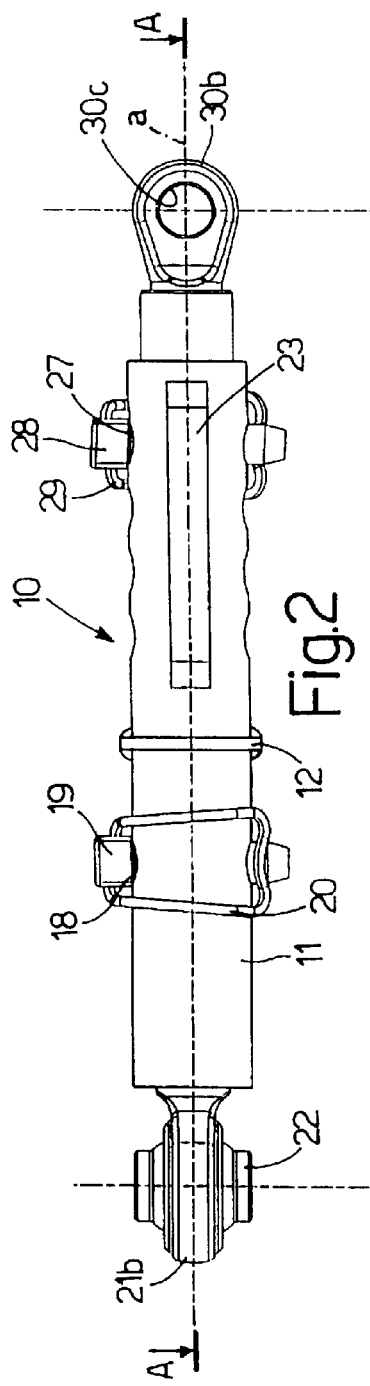
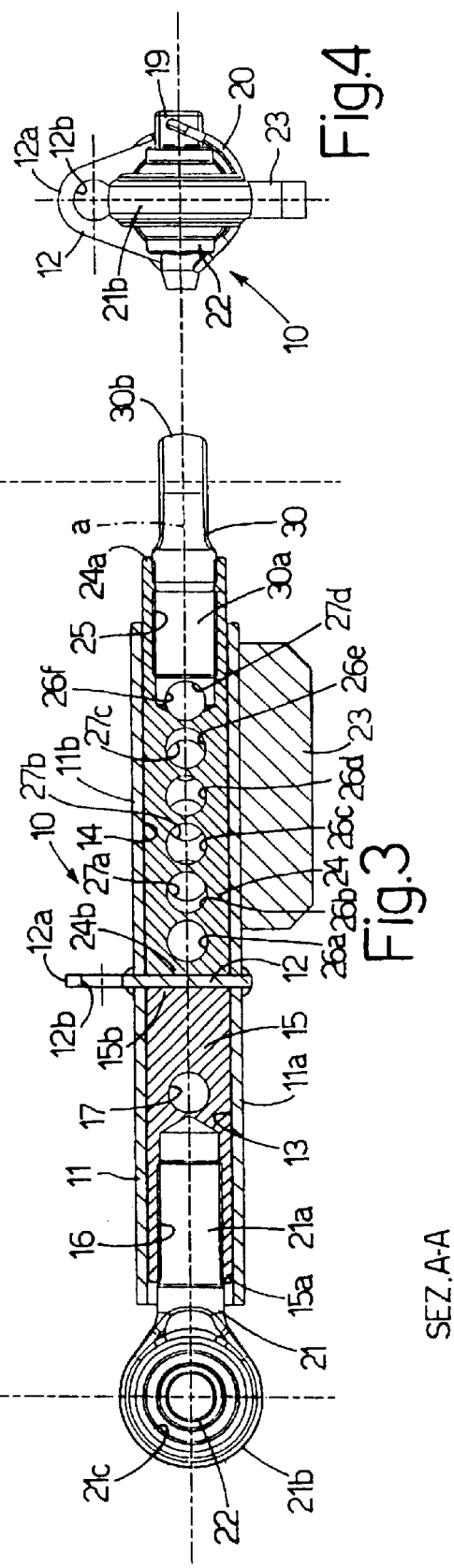

though reference is made in the following description to use of the strut according to the present invention as a stabilizing

STRUT FOR A HITCH DEVICE FOR ATTACHING FARM IMPLEMENTS TO A TRACTOR

BACKGROUND OF THE INVENTION

The present invention relates to hitch devices for attaching farm implements to a tractor and, more particularly, to a strut for a farm implement hitch device.

So-called "three-point hitches" normally comprise a top link and two bottom arms articulated to the tractor frame whereby each bottom arm is connected to a respective hydraulic lifting device. A farm implement, such as a plow or ripper, is fixed by known means to a three-point hitch of the above type.

Hitches of the above type allow the bottom arms to swing laterally when the tractor is moving. Particularly during on-highway transfer and when the implement is raised, lateral swing of the bottom arms is extremely dangerous, and may result in serious damage and/or personal injury caused by collision with the implement and/or hitch components. In such conditions, therefore, steps should be taken to ensure that the hitch and attached implement swing as little as possible. To this end, side struts of a fixed length are provided which operate on the bottom arms of the hitch.

On the other hand, when operating on a field, the strut should act as a stabilizer, since under these conditions it is often necessary to allow the implement to float to a certain extent. In other words, when actually working, it is often preferable to employ, as opposed to an overly rigid implement towing system, one allowing the implement to swing to a certain extent on encountering obstacles (such as stones) in the field.

For this purpose, stabilizing struts have been proposed which are connected, at one end, to the tractor frame, and are fixed at the other end to one of the bottom three-point hitch arms.

Stabilizing struts of this sort provide, in fact, for bracing the implement towing system, e.g. during on-highway transfer of the tractor, while at the same time allowing the three-point hitch and attached implement to swing to a certain extent when working on the field.

The stabilizing struts employed so far, however, fail to provide for reliable adjustment of the degree of rigidity of the implement towing system.

SUMMARY OF THE INVENTION

It is therefore an object of the present invention to provide a reliable strut for use in the hitch apparatus of agricultural tractors.

It is a feature of this invention that a strut for a tractor three-point hitch includes a discrete length adjustment mechanism and two infinite length adjustment devices.

It is another feature of this invention that the infinite length adjustment devices are located on opposite sides of a dividing member It is still another feature of this invention that the infinite length adjustment devices are positioned crosswise to the axis of the strut.

It is an advantage of this invention that the adjustment of the axial length of the strut can be quickly and selectively accomplished.

It is yet another feature of this invention that the adjustment of the length of the strut is accomplished through utilization of a number of through holes in the tubular member of the strut and a number of through holes in the sleeve of the strut.

It is another advantage of this invention that a continuous fine adjustment of the length of the strut can be accomplished at both ends of the strut by manipulation of two rods with respective threaded shanks.

It is still another advantage of this invention that the strut is free to swing within predetermined limits when required.

It is yet another feature of this invention that the tubular member is allowed to float inside a cavity within the strut by lifting the spring member and removing a pin.

It is yet another advantage of this invention that the strut can be preloaded using the fine-adjustment system to eliminate any slack caused by discrete adjustment using the pin.

It is a further advantage of this invention that the degree of float can be adjusted according to the type of work to be performed by the implement attached to hitch device by allowing float on one side of the strut and setting a length at the other side of the strut.

It is another object of this invention to provide a strut apparatus for a three-point hitch mechanism on an agricultural tractor such that the strut may replace the lifting arms of the conventional hitch which are connected to the lower arms of the hitch and which also require a length adjustment mechanism.

These and other objects, features and advantages are accomplished according to the instant invention by providing a strut for a hitch device for attaching farm implements to a tractor. The strut is substantially symmetrical with respect to a longitudinal axis of symmetry, and has a system for adjusting its length along the axis. The adjusting system has fast, discrete length adjustment devices, and two infinite length adjustment devices. The two infinite length adjustment devices are located on opposite sides of a dividing member positioned crosswise to the axis of the strut.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 2 is a side elevational view of the strut depicted in FIG. 1;

FIG. 3 is a cross-sectional view of the strut taken along lines A—A of the FIG. 1; and FIG. 4 is an end view of the strut depicted in FIGS. 1–3.

DETAILED DESCRIPTION OF THE PREFERRED EMBODIMENT

Figure 1:
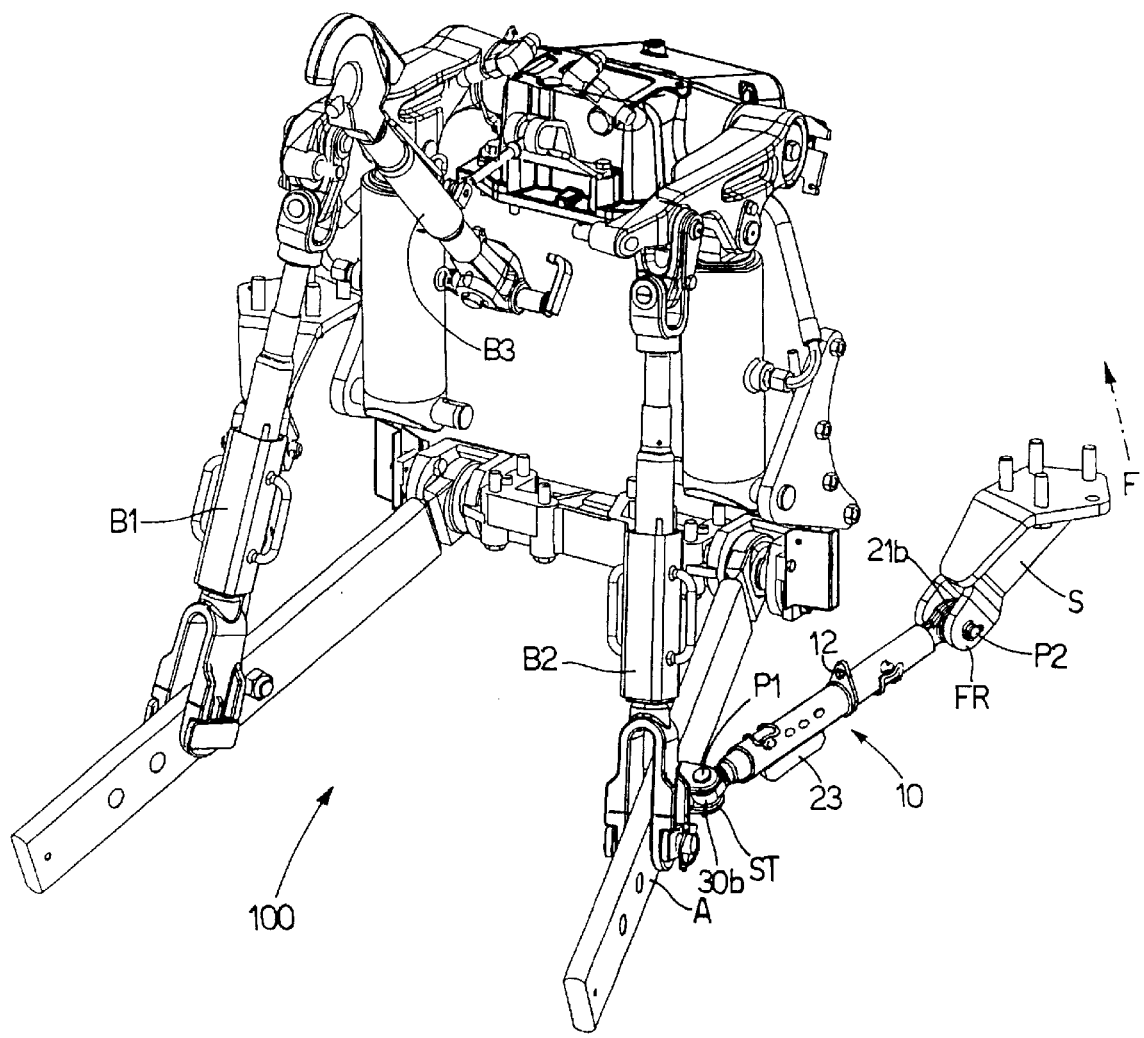
FIG. 1 is a rear perspective view of a three-point hitch apparatus located at the rearward end of an agricultural tractor provided with a strut incorporating the principles of the instant invention, the strut being depicted as connected at one end to a tractor frame, and at the other to a bottom arm of the three-point hitch apparatus.

As shown in FIG. 1, a strut 10 in accordance with the present invention is associated with a three-point hitch apparatus 100 used to connect a conventional farm implement (not shown), such as a wagon, baler or other harvesting implement, to be towed by an agricultural tractor to which the three-point hitch is mounted at the rearward end thereof. Though reference is made in the following description to use of the strut according to the present invention as a stabilizing strut for preventing lateral swing of the hitch, it may be used for replacing other components of the three-point hitch, which need adjustment. In the latter case, the floating capability may require elimination, as will be described in greater detail below. The strut also may be used on a three-point hitch apparatus, whether located at the rear or at the front of the agricultural tractor.

The strut 10 is fitted by known means at one end to a bottom arm A of the hitch device 100, and is supported at the other end by a supporting device S screwed to the frame F of the tractor. More specifically, in the FIG. 1 embodiment, the strut 10 is hinged by a pin P1 at a first end to a bracket ST integral with the arm A, and is hinged by a pin P2 at a second end to a fork FR integral with the support S.

As shown in FIGS. 2–4, the strut 10 comprises a substantially tubular outer body 11. The tubular outer body 11 is divided by a wall 12 into two sleeves 11a, 11b, each having a respective cavity 13, 14. The outer body 111 may be formed by welding sleeves 11a and 11b to the wall 12, which may comprise a projecting portion 12a in which an opening 12b is formed for housing a pin 19, as will be described in greater detail below.

Referring now to FIG. 3, the cavity 13 houses a tubular member 15, at a first end 15a of which is formed a threaded seat 16 extending in the direction defined by a longitudinal axis of symmetry (a). The tubular member 15 also comprises a through hole 17 crosswise to the axis (a). As seen in FIGS. 2 and 3, a second end 15b of tubular member 15 rests against the wall 12, and the transverse through hole 17 is aligned with a through hole 18 (FIG. 2) in the outer body 11, so that the pin 19 need simply be inserted inside the coaxial holes 18 and 17 to connect the tubular member 15 integrally to the outer body 11. The pin 19 is advantageously provided with a substantially U-shaped spring member 20 for preventing, in known manner, accidental withdrawal of the pin 19 from the holes 17, 18. As stated, when not inserted inside the holes 17 and 18, the pin 19 may be housed inside the opening 12a.

A threaded shank 21a of a rod 21 is screwed inside the threaded seat 16. The rod 21 further comprises a head 21b having a seat 21c for housing a spherical joint 22 into which the pin P2, best seen in FIG. 1, is inserted, as stated, to connect one end of the strut 10 integrally to the support S.

At the end near the spherical joint 22, therefore, by lifting the spring member 20 and removing the pin 19 from the through holes 17, 18, the tubular member 15 is allowed to float freely inside the cavity 13. This capability is advantageously employed in certain operating modes of the tractor, as when working on a field.

In a similar manner, the cavity 14 in the sleeve 11b houses a tubular member 24. At a first end 24a of the member 24 a threaded seat 25 is formed, which extends in the direction defined by the longitudinal axis of symmetry (a). The tubular member 24 also comprises a number of through holes 26a–26f crosswise to the axis (a). As seen in FIGS. 2 and 3, a second end 24b of the tubular member 24 rests against the wall 12, and the transverse through hole 26f is aligned with a through hole 27 (FIG. 2) forming part of a series of holes 27a–27d formed in the sleeve 11b, so that a pin 28 (FIG. 2) need simply be inserted inside the coaxial through holes 26f and 27d, such as depicted in FIG. 3, to connect the tubular member 24 integrally to the outer body 11. The holes 26 differ in number from the holes 27, and the series of holes 26 has a different spacing from that of the series of holes 27, increasing the number of positions that the tubular member 24 may take up relative to the outer body 11.

The pin 28 is also advantageously provided, as depicted in FIG. 2, with a substantially U-shaped spring member 29 (identical with the spring member 20) for preventing, in known manner, accidental withdrawal of the pin 28 from the coaxial, aligned through holes.

As shown in FIG. 3, the transverse holes 26a–26f formed in the tubular member 24 and aligned along the axis (a), the through holes 27a–27d formed in the sleeve 11b, and the pin 28 form a system for rapidly adjusting the position of the tubular member 24 with respect to the wall 12 along the axis (a). Obviously, adjusting the position of the tubular member 24 along the axis (a) results in a variation of the overall length of the strut 10.

Accordingly, at the pin P1 end (FIG. 1), by lifting the spring member 29 and removing the pin 28 from the through holes 26f, 27d, the tubular member 24 can be shifted axially, and one of holes 27a–27d (in sleeve 11b) in combination with one of the other holes 26a–26e can be used to selectively and rapidly adjust the axial position of the tubular member 24 by sliding it inside the cavity 14.

A threaded shank 30a of a rod 30 is screwed inside the threaded seat 25. The rod 30 further comprises a head 30b having a seat 30c into which the pin P1 (FIG. 1) is inserted to fix the other end of the strut 10 to bracket ST, which, as already mentioned, is integral with arm A of the hitch device 100.

A finer length adjustment of the strut 10 can be made by rotating the tubular members 15, 24 (connected integrally to the outer body 11 by respective pins 19, 28) with respect to the rods 21, 30 using a plate 23 integral with the outer body 11. In other words, once the strut 10 is mounted, the user can further adjust the length of the strut 10 by manually gripping the plate 23 and rotating the plate 23 about the axis (a) together with the outer body 11 and the tubular members 15, 24. This serves to preload the strut 10 and eliminate any slack caused by using only the pin 28 as a discrete adjustment member.

To be able to lengthen or shorten the strut 10 by rotation of the outer body 11 in the one or other sense, the shanks 21a and 30a of rods 21 and 30 have oppositely directed threads. The same applies to the respective nut screws inside the threaded seats 16 and 25.

Operation of strut 10 according to the present invention is easily deducible from the foregoing description. The main advantages of strut 10 when used as a stabilizing strut according to the present invention are a fast, selective adjustment of the axial length of the strut by means of a number of through holes 26a–26f in tubular member 24, and a number of through holes 27a–27d in sleeve 11b; the continuous fine adjustment of the length of the strut at both ends with respect to the wall 12 by means of the two rods 21, 30 with respective threaded shanks 21a, 30a; and the degree of float can be adjusted according to the type of work to be performed by the implement attached to device 100. The tubular member 15 can be allowed to float inside the cavity 13 by lifting the spring member 20 and removing the pin 19, so that the apparatus 100 is free to swing within given limits when required. The strut 10 can be preloaded using the fine-adjustment system to eliminate any slack caused by discrete adjustment using the pin 28. The degree of float can be adjusted by, on the one hand, allowing float on one side of the strut and, on the other hand, setting a length at the other side.

In embodiments not shown, the strut 10 may advantageously replace the lifting arms B1, B2 (FIG. 1) which are connected to the lower arms A and which also require a length adjustment mechanism. Obviously, for such an arrangement, the float condition would not be required as the arms A otherwise would fall onto the ground. Comparably, the principles of strut 10 also could be applied to top link B3.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a three-point hitch apparatus for attaching implements to an agricultural tractor, said three-point hitch apparatus including a strut substantially symmetrical with respect to a longitudinal axis, the improvement comprising:

a length adjustment apparatus for varying a length dimension corresponding to said longitudinal axis and having a discrete length adjustment mechanism and two infinite length adjustment devices, said infinite length adjustment devices being located on opposite sides of a dividing member positioned crosswise to said longitudinal axis.

2. The three-point hitch apparatus of claim 1 wherein said strut is a stabilizing strut interconnecting a frame of said tractor and a lift arm of said three point hitch apparatus, and wherein one of said two infinite length adjustment devices can float.

3. The three-point hitch apparatus of claim 2 wherein said strut comprises:

first and second sleeves separated by said dividing member, said first sleeve housing a first tubular member forming one of said infinite length adjustment devices, said second sleeve housing a second tubular member forming the second said infinite length adjustment device.

4. The three-point hitch apparatus of claim 3 wherein said first tubular member is able to float freely inside said first sleeve.

5. The three-point hitch apparatus of claim 4 wherein said first tubular member selectively can be fixed to said first sleeve by fastening devices.

6. The three-point hitch apparatus of claim 5 wherein the position of said second tubular member inside said second sleeve is adjustable axially and discretely by fastening members.

7. The three-point hitch apparatus of claim 6 wherein said first infinite length adjustment device includes an opposite thread to that of said second infinite length adjustment device.

8. The three-point hitch apparatus of claim 7 wherein at least one of said sleeves includes a grip member integral therewith, said grip member facilitating rotation of said at least one sleeve with respect to said longitudinal axis.

9. The three-point hitch apparatus of claim 6 said fastening devices and said fastening members are provided with elastic means for preventing accidental withdrawal thereof from respective seats therefor.

10. The three-point hitch apparatus of claim 6 wherein said first infinite length adjustment device includes a first seat for a spherical joint, said second infinite length adjustment device includes a second seat, each of said first and second seats housing a respective pin.

* * * * *